United States Patent
Baughman et al.

(10) Patent No.: US 10,075,417 B2
(45) Date of Patent: Sep. 11, 2018

(54) VERIFYING TRUSTWORTHINESS OF REDIRECTION TARGETS IN A TIERED WEB DELIVERY NETWORK

(71) Applicant: INTERNATIONAL BUSINESS MACHINES CORPORATION, Armonk, NY (US)

(72) Inventors: Aaron K. Baughman, Silver Spring, MD (US); Yaser K. Doleh, North Royalton, OH (US); Mauro Marzorati, Lutz, FL (US); Gregory A. Porpora, New Fairfield, CT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 12 days.

(21) Appl. No.: 15/262,140

(22) Filed: Sep. 12, 2016

(65) Prior Publication Data
US 2018/0077120 A1   Mar. 15, 2018

(51) Int. Cl.
*H04L 29/06* (2006.01)

(52) U.S. Cl.
CPC ...... *H04L 63/0281* (2013.01); *H04L 63/1408* (2013.01); *H04L 63/1441* (2013.01)

(58) Field of Classification Search
CPC ..... H04L 63/02; H04L 63/0281; H04L 63/14; H04L 63/1408; H04L 63/1416; H04L 63/1441; H04L 63/1483; H04L 61/15; H04L 61/1505; H04L 61/1511
See application file for complete search history.

(56) References Cited

U.S. PATENT DOCUMENTS

| | | | |
|---|---|---|---|
| 8,959,643 B1* | 2/2015 | Invernizzi | H04L 63/1425 713/187 |
| 9,021,254 B2 | 4/2015 | Bokarius et al. | |
| 9,038,171 B2 | 5/2015 | Jeremiah | |
| 9,178,901 B2 | 11/2015 | Xue et al. | |
| 2008/0082662 A1* | 4/2008 | Dandliker | H04L 63/10 709/225 |
| 2014/0059649 A1* | 2/2014 | Hu | H04L 63/08 726/3 |
| 2016/0014122 A1 | 1/2016 | Pieczul et al. | |
| 2016/0156666 A1 | 6/2016 | Rajagopal et al. | |

FOREIGN PATENT DOCUMENTS

CN     1306749 C     12/2003

OTHER PUBLICATIONS

Le et al., "PhishDef: URL Names Say It All," arXiv:1009.2275v1, Sep. 12, 2010 (9 pages).
Modi et al., "A survey on security issues and solutions at different layers of Cloud computing," J Supercomput, Oct. 13, 2012 (32 pages).

* cited by examiner

*Primary Examiner* — Theodore C. Parsons
*Assistant Examiner* — Adrian Stoica
(74) *Attorney, Agent, or Firm* — Griffiths & Seaton PLLC

(57) ABSTRACT

Embodiments for verifying trustworthiness of redirection targets in a tiered delivery computing network by at least a portion of a processor. A degree of trustworthiness for a uniform resource locator (URL) is determined by validating at least one attribute of the URL to establish a reputation score of the URL. The URL is classified, using the reputation score, into one of a plurality of classifications to indicate the degree of trustworthiness.

20 Claims, 14 Drawing Sheets

VERIFYING TRUSTWORTHINESS OF REDIRECTION TARGETS IN A TIERED WEB DELIVERY NETWORK

BACKGROUND OF THE TECHNOLOGY

Field of the Technology

The present technology relates in general to computing systems, and more particularly to, various embodiments for verifying trustworthiness of redirection targets in a tiered web delivery network using a computing processor.

Description of the Related Art

In today's society, consumers, business persons, educators, and others use various computing network systems with increasing frequency in a variety of settings. A popular forum for world-wide data communication linking together computers on a global basis is the Internet. Generally, an Internet web page's address or URL is made up of the name of the server along with the path to the file or the server. Rather than using a web hosting service's server name as their URL, most companies and many individuals and other entities prefer a "domain name" of their own choosing. A domain name is a meaningful and easy-to-remember "handle" for an Internet address. The domain name system (DNS) is a name resolution protocol through which Internet domain names are located and translated into Internet Protocol addresses. A DNS converts host names to IP addresses and vice-versa. Each domain is managed by a DNS name server, which is a server that contains the host name information about the hosts and sub-domains within its domain.

SUMMARY OF THE TECHNOLOGY

Various embodiments for verifying trustworthiness of redirection targets in a tiered web delivery network by at least a portion of one or more processors, are provided. In one embodiment, by way of example only, a method for verifying trustworthiness of redirection targets in a tiered web delivery computing network, again by a processor, is provided. A degree of trustworthiness for a uniform resource locator (URL) is determined by validating at least one attribute of the URL to establish a reputation score of the URL. The URL is classified, using the reputation score, into one of a plurality of classifications to indicate the degree of trustworthiness.

BRIEF DESCRIPTION OF THE DRAWINGS

In order that the advantages of the technology will be readily understood, a more particular description of the technology briefly described above will be rendered by reference to specific embodiments that are illustrated in the appended drawings. Understanding these drawings depict only typical embodiments of the technology and are not therefore to be considered to be limiting of its scope, the technology will be described and explained with additional specificity and detail through the use of the accompanying drawings, in which.

DETAILED DESCRIPTION OF THE DRAWINGS

Figure 1:
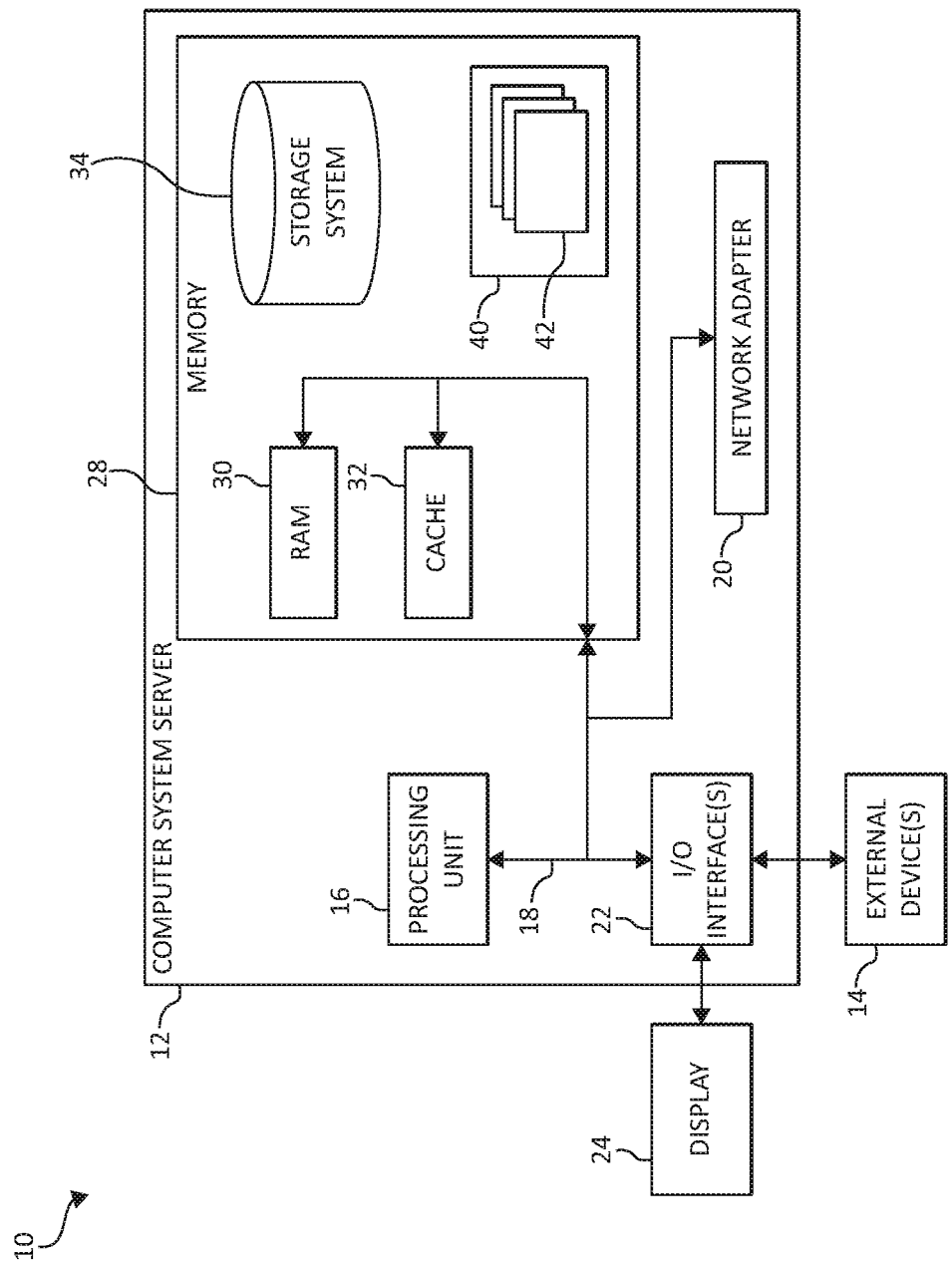
FIG. 1 is a block diagram depicting an exemplary cloud computing node according to an embodiment of the present technology.

Before the present technology is disclosed and described, it is to be understood that this technology is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flowcharts and processes are provided for clarity in illustrating steps and operations and do not necessarily indicate a particular order or sequence.

As previously indicated, the Domain Name System (DNS) network protocol is being increasingly utilized by malicious actors as a medium for covert channels. Communications that would otherwise be disallowed by network firewalls or other security monitoring systems may be able to readily pass through a network undetected as a DNS communication thereby compromising integrity and security. Further, the DNS protocol has significant room for user-defined data and supplementary text fields which may be utilized by a hacker to transmit covert information. Additionally, DNS servers are decentralized, making it easy to set up a DNS server that will function as the receiving end of covert DNS tunnels.

For example, a botnet may be a collection of compromised hosts, called bots. These bots are controlled by a bot master through a command and control (C&C) channel. Botnets can be classified according to the underlying C&C communication protocol. The term botnet is also used to refer to a collection of compromised computers/devices (e.g., often referred to as zombie computers/devices, such as computer executing software). Botnets are usually installed via drive-by downloads exploiting web browser vulnerabilities, worms, Trojan horses, and/or backdoors, under a common C&C infrastructure. Malicious actors are currently subverting the DNS protocol to exchange information between a C&C bot master and its controlled hosts. Specially crafted DNS queries are able to convey information to C&C collectors causing undetected exfiltration of information from corporate networks. In a similar fashion, specially crafted DNS resource records (RR's) are employed to distribute instructions and data to controlled machines.

Also, fast flux DNS is a technique that a cybercriminal can use to prevent identification of the malicious actor's key host server's IP address. By abusing the way the DNS system works, a criminal can create a botnet with nodes that join and drop off the network faster than law enforcement officials can trace them. Fast flux DNS takes advantage of the way load balancing is built into the domain name system. DNS systems allow an administrator to register a number of IP addresses with a single host name. The alternate addresses are legitimately used to distribute Internet traffic among multiple servers. The IP addresses associated with a host domain do not change very often, if at all. However, malicious actors have discovered that they can hide key servers by using a sixty-second time-to-live (TTL) setting for their DNS resource records and swapping the records' associated IP addresses in and out with extreme frequency. Since abuse of the system requires the cooperation of a domain name registrar, most fast flux DNS botnets are believed to originate in emerging countries or other countries without cybercrime enforcement laws.

In one aspect, fast-flux botnets are responsible for many illegal practices, including money mule recruitment sites, phishing websites, illicit online pharmacies, extreme or illegal adult content sites, malicious browser exploit sites and web traps for distributing malware. Automated Certificate Management Environment (ACME) is a protocol for automating the management of domain-validation certificates, based on a JavaScript Object Notation (JSON)-over-hyper text transfer protocol secure (HTTPS) interface. An objective of a certificate of authority, such as, for example, "Let's Encrypt" and the ACME protocol provides for setting up an HTTPS server to automatically obtain a browser-trusted certificate, without any human intervention. This protocol aims at removing the barriers for operating secured HTTPS servers by removing the heretofore cumbersome steps of installing certain certificates on HTTPS server. One implication is that domain-validation certificates may be proliferated and may become ubiquitous. Since HTTPS servers guarantee privacy between the two endpoints, Intrusion Detection System (IDS) or a Data Loss Prevention System (DLPS) may be precluded from examining the traffic. Therefore, a need exists in determining a reputation of the endpoint before communication is allowed to commence so as to ensure that Internet content served to a client is devoid of redirection to untrusted endpoints.

Accordingly, the present technology provides a solution for coordinating outbound security controls in a data center environment that can be standalone, or attached to an IDS or DLPS. An augmented DNS server function may allow name resolution requests to be fulfilled only for trustworthy destinations. In this manner, traffic outbound from controlled resources may be managed without any alteration on the controlled resources by specifying the address of a cognitive DNS server as a local DNS server in a resolver configuration.

In an additional aspect, the mechanisms of the embodiment provide for verifying trustworthiness of redirection targets in a tiered web delivery computing network, again by a processor. A degree of trustworthiness for a uniform resource locator (URL) is determined by validating at least one attribute of the URL to establish a reputation score of the URL. The URL is classified, using the reputation score, into one of a plurality of classifications to indicate a degree of trustworthiness. That is, the URL is classified as either benign, malignant, suspicious, and/or malicious, according to the reputation score.

The mechanisms of the embodiment establish if a given character string represents a resource that is benign, malignant, suspicious, and/or malicious. In one aspect, a "reputation" score may be established of a resource that is being requested, via a variable number of independent analytic methods by applying one or more heuristics and a weighted average. For example, a reputation score within a selected or define ranged may categorize or classify a character string and/or domain name as benign, malignant, suspicious, and/or malicious. In one aspect, an analytic metric-operation may be a DNS response resource record botnet signature detection analysis. For example, a DNS response (answer, authority and additional sections) may be captured, extracted and analyzed in real-time where extracted features may be examined via heuristic analysis to classify a domain as either benign, malignant, suspicious, and/or malicious. This is reflective of real-world statistical analytical outcomes which are advantageous to prevent a classifier from confusing the battle space with outliers.

For example, the DNS response resource record botnet signature detection analysis may include classifying a domain as either benign, malignant, suspicious, and/or malicious based on a time to live (TTL), non-contiguous IP address, time zone entropy anomalies, and/or a fluxness. That is the DNS response resource record botnet signature detection analysis may include classifying a domain according to a) TTL where a short time to live for a domain is a signature for fast flux and domain generation algorithm (DGA) based botnet C&C servers, b) noncontiguous IP addresses with one or more indicators of a fast fluxing site, c) Time Zone Entropy (TZE) anomalies that may result from IP addresses coming from different time zones (fast flux indicator), d) and/or a fluxiness ratio of single IP response as compared to multiple diverse responses (e.g., fluxiness=Na/Nsingle) where, "Na" represents a number of unique A records returned in all DNS lookups, where legitimate domains may return only one to three A records whereas fast-flux domains may return five or more A records that may be in a single lookup, and "N single" may be a number of A records in a single lookup returns where A value '=1:0 means that the set of A records remains constant over several consecutive lookups, which is reflective for benign domain names. In contrast, value'=1:0 may indicate that at least one new A record may be observed in consecutive requests, a strong indication of Fast Flux domain.

In an additional aspect for an analytic metric operation for classifying a domain as either benign, malignant, suspicious, and/or malicious, domain attribution & validation analytics may include an IP address attribution analysis being performed by comparing "WhoisGeoIP" database registration against one or more key features that indicate malicious site signature elements, such as, for example, an autonomous system number (ASN) number, country registration, country entropy, and/or domain age. For example, A) the ASN number may be a key signature for identifying a URL as a malicious site where multiple ASNs result from multiple disparate IP's. B) A country registration may be a key signature for identifying a URL as a malicious site where there are multiple country registrations. C) A country entropy may be a key signature for identifying a URL as a malicious site where a country registration is not in the same hemisphere or within a next time zone. D) A site-domain registration date may be a key signature for identifying a URL as a malicious site where the site Registration is within a few weeks or less from the request date.

In an additional aspect for an analytic metric operation for classifying a domain as either benign, malignant, suspicious, and/or malicious, a domain-IP cross verification to an intelligence database may be used where the DNS domain name IP address may be cross verified against a black-white list and other Cyber Intelligence sources. For example, the domain-IP cross verification operation includes comparing the DNS domain name IP address against trusted reputation stores. The mechanisms of the embodiments provide for a learning system that may perform a sequence of steps to establish the trustworthiness of a resource being referenced, such as, for example the URL. In one aspect, an operation for establishing the trustworthiness of a resource may include verification of a domain's registry age, verification of completeness of services provides within the domain, and other similar 'good neighbor' activities. In this way, "fly-by-night" operators being reliant on setting up shop (e.g., quickly establishing a domain name) quickly and moving on will fail to provide the complete usual services required for a domain, such as mail exchangers, abuse addresses, secured web services, etc. A reverse proxy, which anchors a tiered delivery network, may be assigned and tasked with establishing if the resource being referenced has one or more bona fide attributes (e.g., non fraudulent or non-counterfeited attributes) before delivering the URL to the user. If the URL is determined to be trustworthy, a client may be allowed to connect with the URL, otherwise a determination is made as to either rewrite the URL or deny the connection according to the classification based on the reference score. Accordingly, any malicious actors are completely prohibited from sending Internet content to a client in a tiered web delivery network.

It should also be noted that data may be processed through a variety of geographically disbursed computing components, where, for example, a local node may contain a set of data processing components yet remain in remote communication with other portions of the distributed data processing system. To wit, a user's data may not be locally stored or processed on the user's local computer, but is instead hosted by one or more distributed storage components that are in remote communication with the local computer. This type of data storage may, in some cases, be referred to as "cloud," or "cloud-based" storage.

It is understood in advance that although this disclosure includes a detailed description on cloud computing, implementation of the teachings recited herein are not limited to a cloud computing environment. Rather, embodiments of the present technology are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the technology described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the technology.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the technology as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
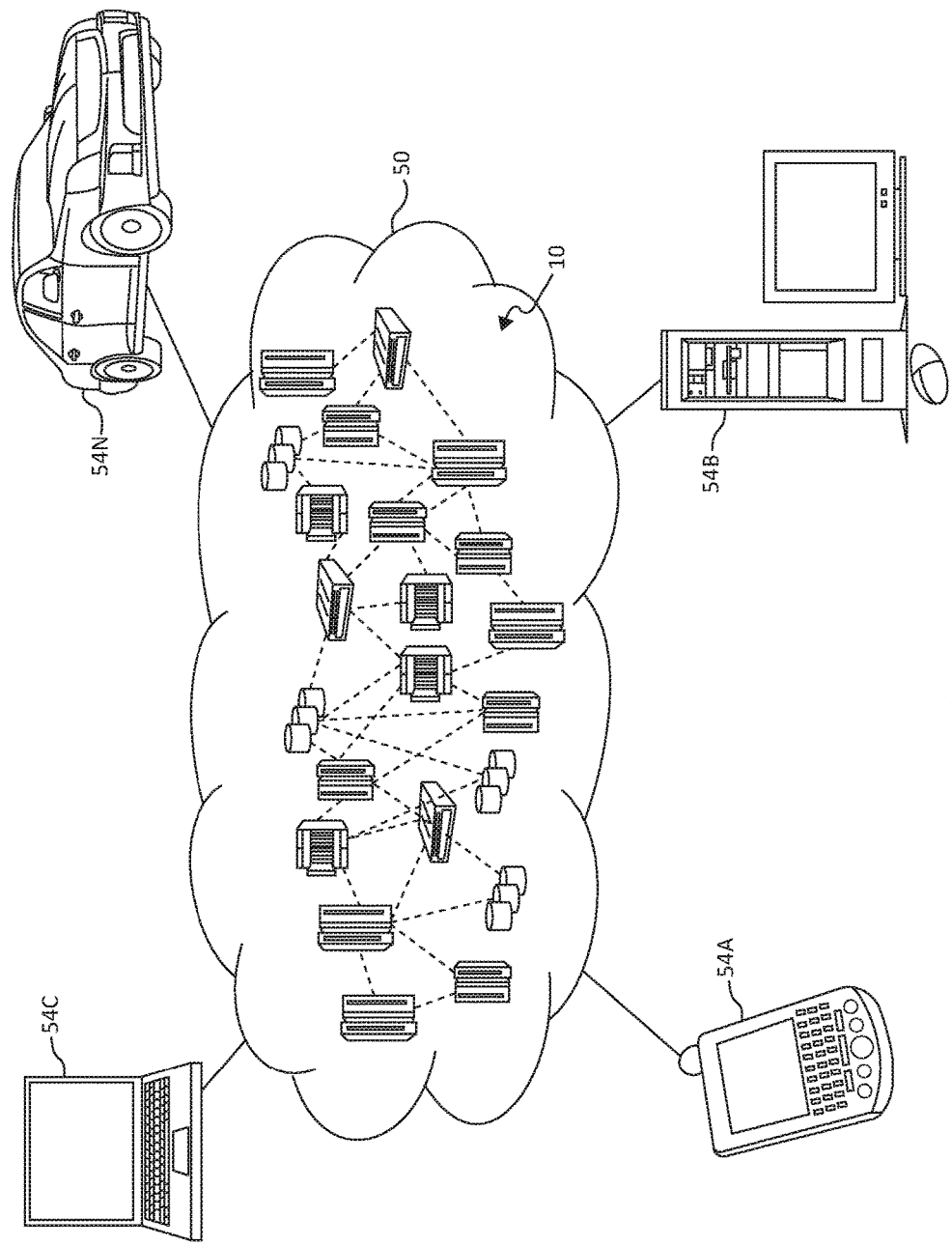
FIG. 2 is an additional block diagram depicting an exemplary cloud computing environment according to an embodiment of the present technology.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
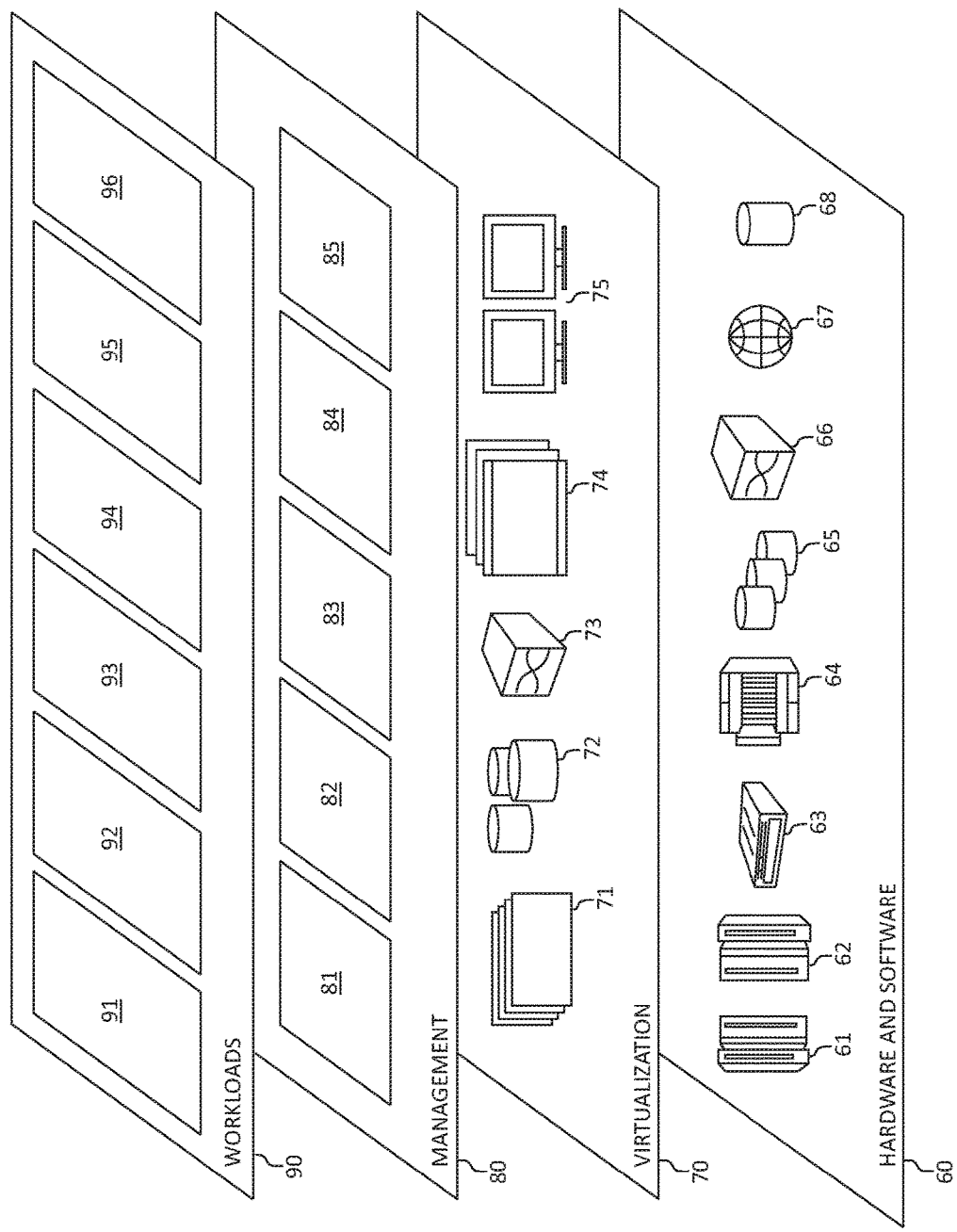
FIG. 3 is an additional block diagram depicting abstraction model layers according to an embodiment of the present technology.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the technology are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 or (aka "verifying trustworthiness of redirection targets layer") provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present technology, various verifying trustworthiness of redirection targets workloads and functions 96. In addition, verifying trustworthiness of redirection targets workloads and functions 96 may include such operations as verifying trustworthiness of URL's/domain names functionality, enforcement compliance functionality, comparison and matching analytics, cookie registration rules analysis, suppressing cookies from being relayed to an application, and as will be further described, user and device management functions. One of ordinary skill in the art will appreciate that the registration enforcement services workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present technology.

As previously mentioned, the mechanisms of the illustrated embodiments provide novel approaches for verifying trustworthiness of redirection targets by determining a degree of trustworthiness for a uniform resource locator (URL) by validating at least one attribute of the URL to establish a reputation score of the URL; and classifying the URL, using the reputation score, into one of a plurality of classifications to indicate a degree of trustworthiness.

Figure 4:
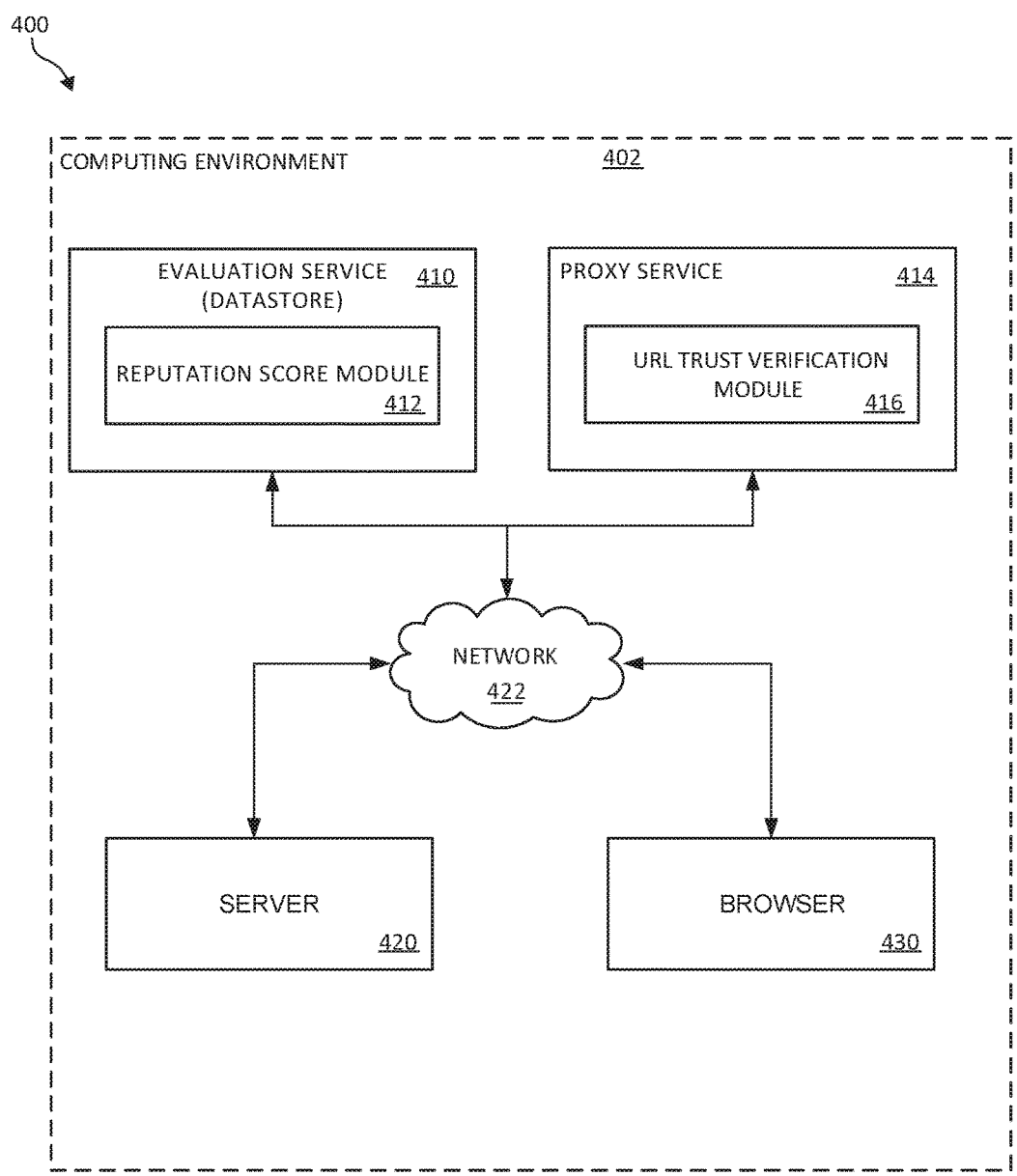
FIG. 4 is an additional block diagram depicting various user hardware and cloud computing components functioning in accordance with aspects of the present technology.

Turning now to FIG. 4, a block diagram 400 depicting exemplary functional components 400 according to various mechanisms of the illustrated embodiments, is shown. FIG. 4 illustrates one or more functions, workloads, and/or protocols for verifying trustworthiness of redirection targets. In one aspect, each of the components, modules, and/or functions described in FIGS. 1-3 may also apply to the components, modules, and functions of FIG. 4. For example, in one aspect, the computing environment 402 may include various components of FIG. 1, such as the computer system/server 12 and/or processing unit 16, to perform various computational, data processing, workloads, and other functionality in accordance with various aspects of the present technology. Moreover, the computing environment 402 may provide virtualized computing services (i.e., virtualized computing, virtualized storage, virtualized networking, etc.). More specifically, the computing environment 402 may include and/or be associated with a virtual computing environment that provides virtualized computing, virtualized storage, virtualized networking and other virtualized services that are executing on a hardware substrate.

In one aspect, the computing environment 402 may include an evaluation service 410 (e.g., datastore) in order to allow verifying trustworthiness of redirection targets and provide a reputation score using the reputation score module 412. The evaluation service 410 may also include the reputation score module 412, containing one or more reputation scores for each domain that have been classified according to the reputation score indicating a degree of trustworthiness. The computing environment 402 may also include a proxy service 414, which may include a URL trust verification module 416, to work in conjunction with the evaluation service 410 to verify trustworthiness of redirection targets in a tiered web delivery computing environment. Also, the computing environment 402 may provide data communication between the evaluation service 410, proxy service 414, server 420, and/or web browser 430 (or client) via the network 422.

In one aspect, evaluation service 410 and the proxy service 414 of the computing environment 402 may employ one or more various mathematical operations (e.g., using addition, subtraction, division, multiplication, standard deviations, means, averages, statistical modeling using statistical distributions, etc.) and undergo various data analytics functions. As part of the evaluation service 410, a web browser or client, such as web browser 430, may issue to a server, such as server 420, a URL that is to be redirected to the proxy service 414 in order to verify the trustworthiness of the redirected URL. That is, the URL is sent to the server 420 via the proxy service 414. The proxy service 414 may extract information of the URL (e.g., decompose the URL) that may be further extracted at a reverse proxy (e.g., proxy service 414) providing access to an application server, such as server 420. The proxy service 414 may decompose the URL to establish a trustworthiness of a fully qualified domain name (FQDN) and a URL path. The proxy service 414 may employ the evaluation service 410 to classify the FQDN or the character string related to the URL as benign, malignant, suspicious, or malicious. The proxy service 414 may redirect the URL to a target browser, such as browser 430, upon the degree of trustworthiness being classified as benign. The proxy service 414 may redirect the URL to a warning page related to the target browser 430 upon the degree of trustworthiness being classified as suspicious. The proxy service 414 may redirect the URL to a warning page related to the target browser 430 upon the degree of trustworthiness being classified as anomalous. The proxy service 414 may redirect the URL to a denied assess page related to the target browser 430 upon the degree of trustworthiness being classified as malicious. In short, the proxy service 414 completely eliminates malicious actors as a medium from sending Internet content to a client in a tiered web delivery network.

Figure 5:
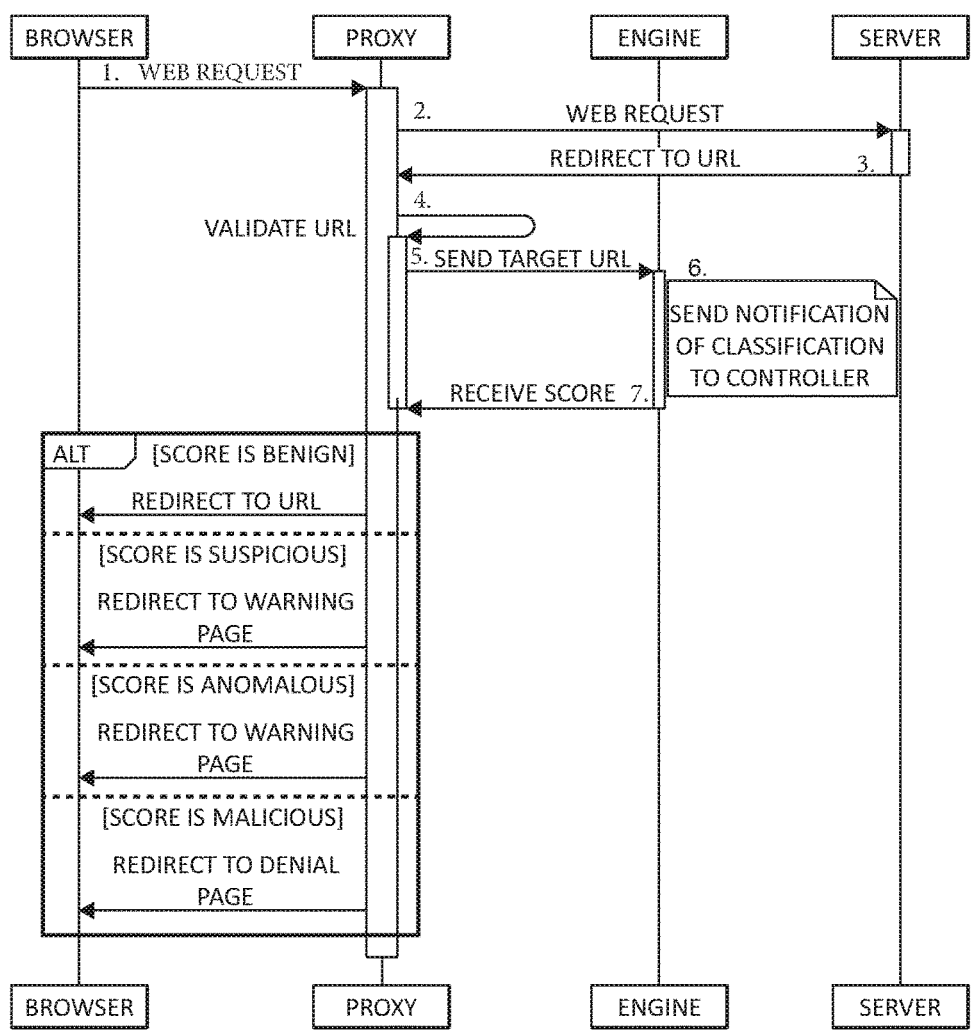
FIG. 5 is a flow diagram depicting an exemplary method for verifying trustworthiness of redirection targets in a tiered web delivery computing network in which aspects of the present technology may be realized.

Turning now to FIG. 5, a flow diagram depicting exemplary functional components 500 according to various mechanisms of the illustrated embodiments, is shown. FIG. 5 illustrates one or more functions, workloads, and/or protocols for verifying trustworthiness of redirection targets in a tiered web delivery computing network. In one aspect, each of the components, modules, and/or functions described in FIGS. 1-4 may also apply to the components, modules, and functions of FIG. 5. The components, modules, and/or functions described in FIG. 5 may include a browser, a proxy, a registry, and a server. Consider the following example of an implementation of the functionality of FIG. 5. 1) A browser may send a web request to a proxy. The proxy may be an agent that delivers to the browser, and/or receives from the browser, web browser pages in the web delivery network. 2) The proxy may send the web request to the server. 3) The server redirects the redirect target to URL (or redirect target or URL) to the proxy. The proxy may apply one or more heuristics in the processing of redirection targets that are present in web pages. 4) The proxy validates the URL. 5) The proxy may send a target URL to the engine. 6) The engine may classify the URL according to a reputation score and may send a notification of the classification to a controller (not depicted for illustrative convenience). 7) The proxy receives the reputation score from the engine.

As an optional step (e.g., "alt" in FIG. 5), if the proxy receives a reputation score categorized or classified as benign, the URL is redirected to the browser. If the proxy receives a reputation score categorized or classified as suspicious, the URL is redirected to a warning page related to the browser. If the proxy receives a reputation score categorized or classified as anomalous, the URL is redirected to a warning page related to the browser. If the proxy receives a reputation score categorized or classified as malicious, the URL is redirected to a denial page related to the browser.

In one aspect, the mechanism of the present embodiments may use classifiers, such as Naïve Bayes classifiers, to provide security services, using a list of words to identify malware. The four classification outputs enable the Bayesian classifiers to more precisely describe the internet content and URLs and the proscribed actions.

Figure 6:
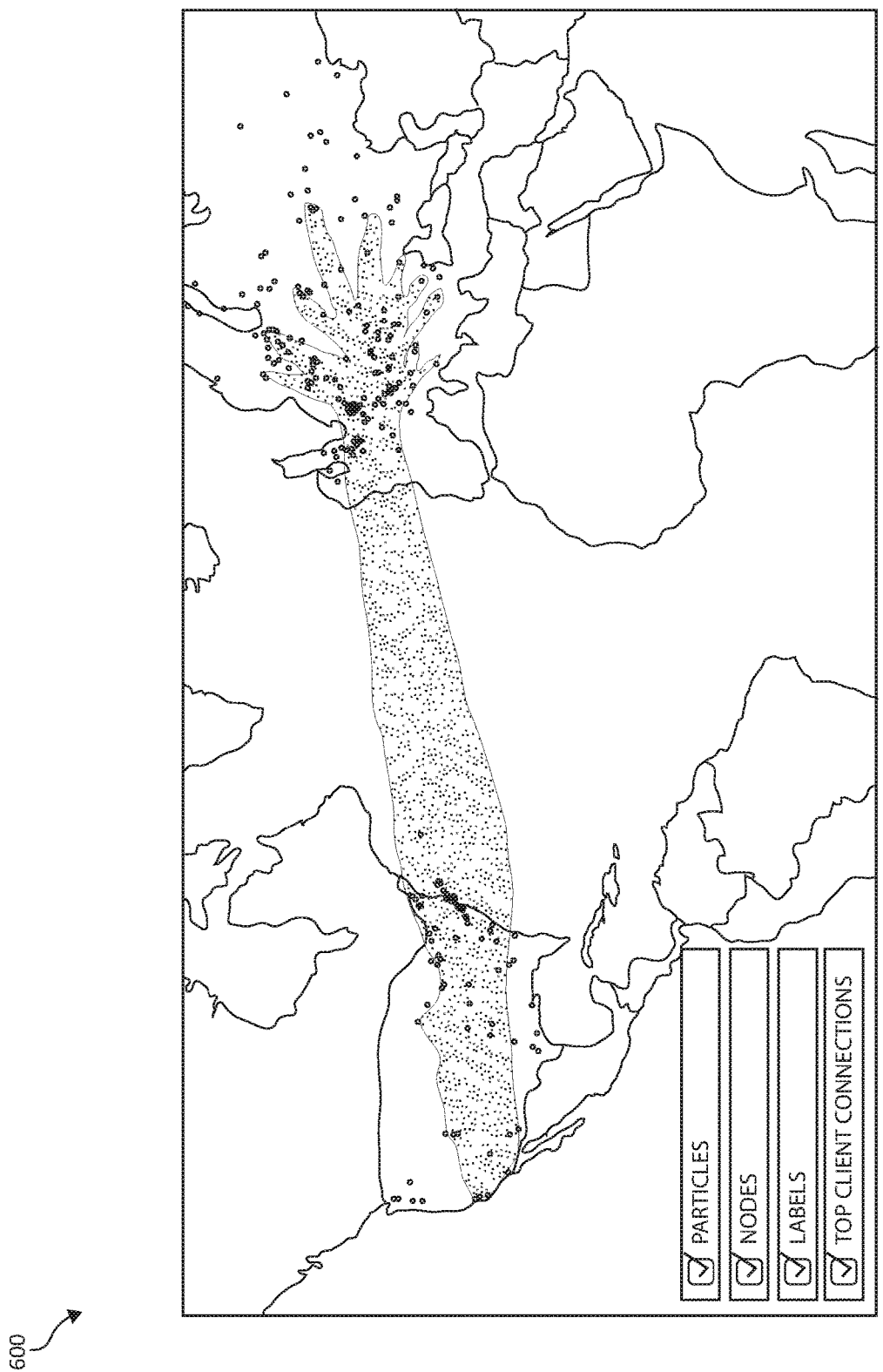
FIG. 6 is a diagram depicting a graph of TorFlow data throughout the world, in which aspects of the present technology may be realized.

Turning now to FIG. 6, a method 600 for a diagram depicting a TorFlow data throughout the world, in which various aspects of the illustrated embodiments may be implemented. The TorFlow maps the Tor network's nodes and data movements based on the IP addresses and bandwidth of the "relay" computers that bounce around its users' connections to prevent them from being censored or surveilled, as depicted in FIG. 6.

In one aspect, one or more classes of predictors may be used to determine the trustworthiness of a URL according to a reputation score. The first class of predictors may be identifying the users of darknet information. Darknets may be defined as those IP addresses which are either unassigned or unused. Such darknets typically only receive traffic for one of three reasons: accident/mistake, backscatter, and malicious scanning. Accidental requests typically only result in a small percentage of requests to darknets. URLs, as opposed to IP addresses, can be leveraged when accessing web based resources. Therefore, accidental darknet requests would only occur if a human used and mistyped an IP address or the URL used had an incorrect DNS entry, which pointed to a darknet. As part of using the darknet, one or more features or attributes may be used, such as for example the traffic going to TorFlow data network, an amount of data going to the Tor network within a payload, and a likelihood of a country using the Tor network.

A second type of predictor may be cloud features such as, for example, a number of DNS changes for a domain, a velocity of DNS changes for a domain acceleration of DNS changes for a domain, a number of lines of code in webpage before submitting, a number of lines of code, a number of forms, and the like. The third type of predictor may be patterns of life that are gleaned from an originating webpage and destination page, such as, for example, a number of negative entities, a number of positive entities, cross correlation, cross correlation with a number of tweets about negative entities, a second degree of the number of negative entities, a second degree of the number of positive entities.

Figure 7:
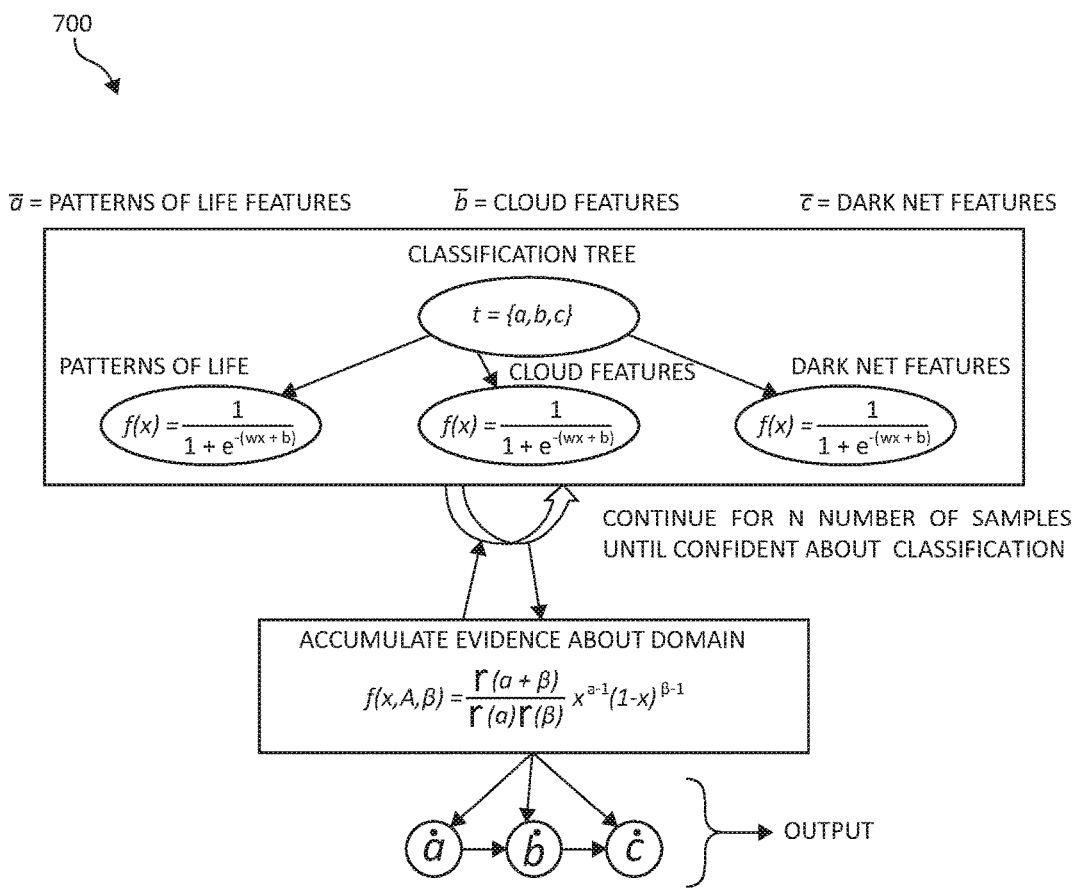
FIG. 7 is a flowchart diagram depicting an exemplary method for evaluating a uniform resource locator (URL) by a processor, again in which aspects of the present technology may be realized.

Turning now to FIG. 7, depicts a classification tree 700 with patterns of life, darknet features, and cloud features for evaluating a uniform resource locator (URL). After evidence for a sample in time has been accumulated, a feature vector "t" may enter the classification tree. The classification may include the vector "t" that is equal to $\{\bar{a}, \bar{b}, \bar{c}\}$ were $\bar{a}$ equals the patterns of life features, $\bar{b}$ equals the cloud features, and $\bar{c}$ equals the darknet features.

In one aspect, the patterns of life, cloud features, and the darknet features may use the function:

$$f(x) = \frac{1}{1 + e^{-(wx+b)}}, \quad (1)$$

The accumulation of evidence about a domain may be determined using the function:

$$f(x; \alpha, \beta) = \frac{\Gamma(\alpha+\beta)}{\Gamma(\alpha)\Gamma(\beta)} x^{\alpha-1}(1-x)^{\beta-1} = 1/B(\alpha, \beta) x^{\alpha-1}(1-x)^{\beta-1} \quad (2)$$

All of the features with a feature metatag may be stratified to specific logistic regression models. After N number of samples are gathered with confidence values in the classification tree, each of the confidence values with classification of malicious (bad) or benign (good) may be used to build a confidence of confidences, where N may be a positive integer. That is, continue for N number of samples until reaching a degree of confidence regarding the classification. In one aspect, a markov model may be continuously used upon reaching a confidence that enough votes from each leaf in the classification has been obtained. Otherwise, evidence may be collected and accumulated about a specific domain until a selected number of votes may be obtained. Finally, an output of the classification tree may be a product of all products (e.g., $\bar{a}$, $\bar{b}$, $\bar{c}$) of confidence and confidence of confidence.

Figure 8:
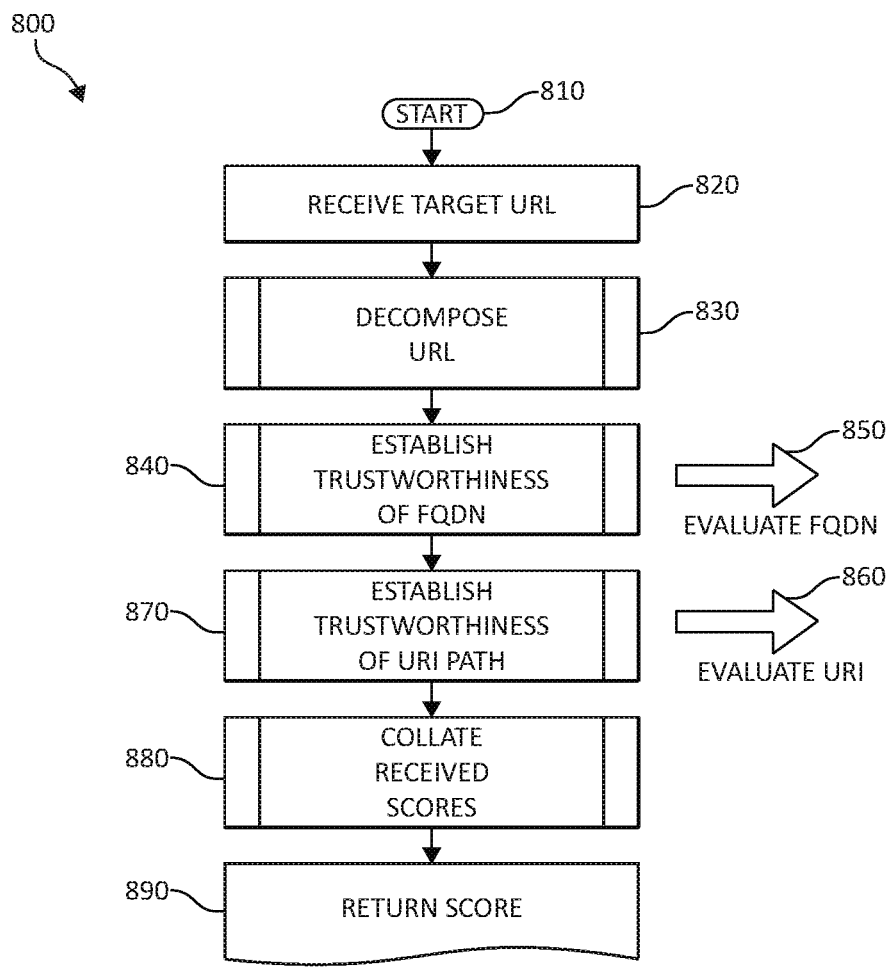
FIG. 8 is a flowchart diagram depicting an additional exemplary method for evaluating a uniform resource locator (URL) by a processor, again in which aspects of the present technology may be realized.

FIG. 8 is a flowchart diagram depicting an exemplary method for verifying trustworthiness of redirection targets in web pages by evaluating a uniform resource identifier (URI) by a processor, in which aspects of the present invention may be realized. The functionality 800 may be implemented as a method executed as instructions on a machine, where the instructions are included on at least one computer readable medium or on a non-transitory machine-readable storage medium. The functionality may start in block 810. At block 820, a target URL may be received. The URL may be decomposed (e.g., at a proxy service), as in block 830. A trustworthiness of FQDN may be established using a proxy service, as in block 840. The proxy service may request, from an evaluation service, an evaluation of the FQDN, as in block 850. A trustworthiness of a URI path may be established using a proxy service, as in block 870. The proxy service may request, from an evaluation service, an evaluation of a URI, as in block 860. The URI may be a string of characters used to identify a resource. One or more reputation scores may be collated, as in block 880. The reputation score may be returned to a proxy, as in block 890.

Figure 9:
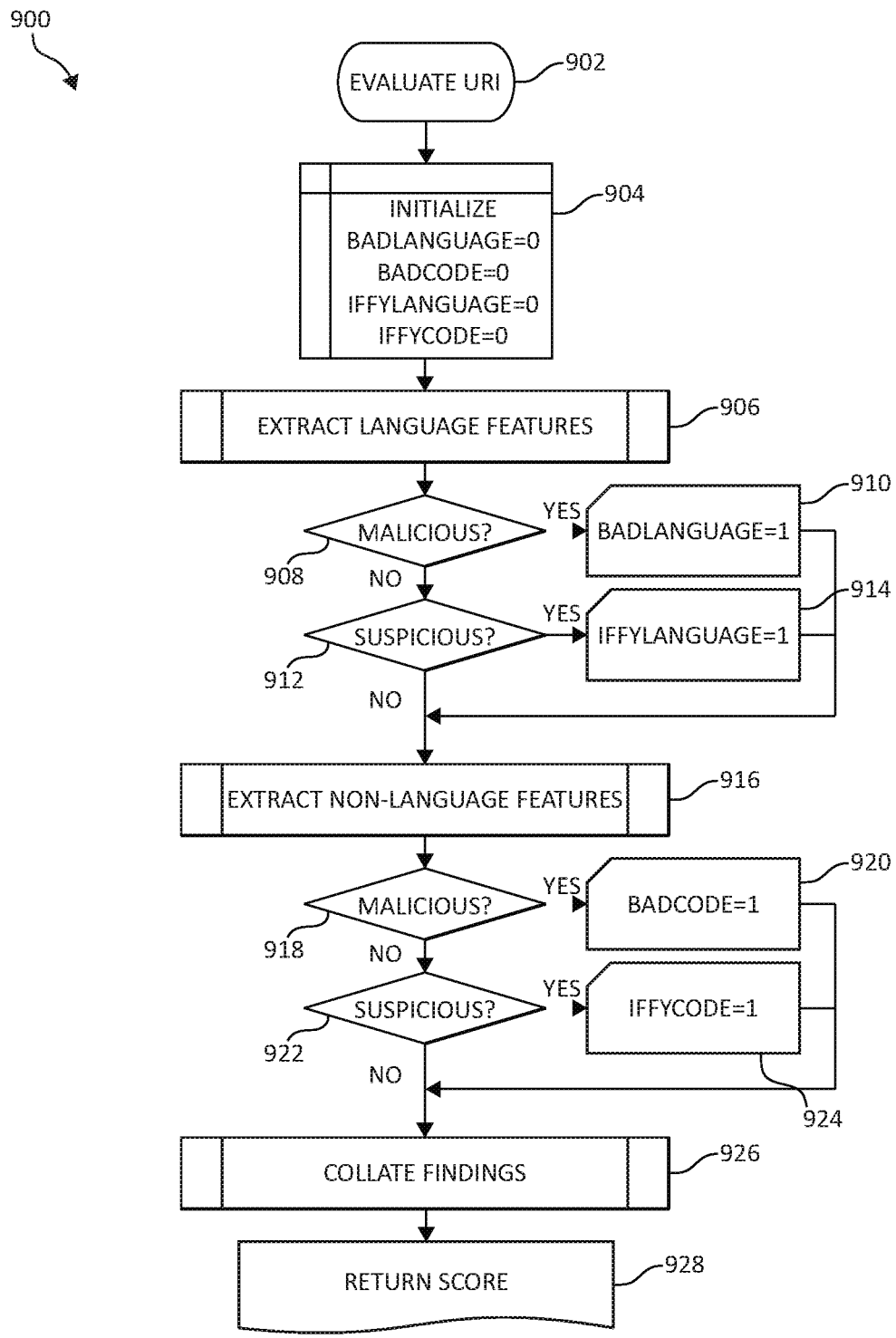
FIG. 9 is a flowchart diagram depicting an exemplary method for evaluating a fully qualified domain name (FQDN) by a processor, again in which aspects of the present technology may be realized.

FIG. 9 is a flowchart diagram depicting an exemplary method for verifying trustworthiness of redirection targets in web pages by evaluation of a FQDN by a processor, in which aspects of the present invention may be realized. The functionality 900 may be implemented as a method executed as instructions on a machine, where the instructions are included on at least one computer readable medium or on a non-transitory machine-readable storage medium. The functionality may start in block 902 by evaluating a URI. At block 904, an initialization operation may be performed by setting equal to zero 1) "badlanguage" (which may be negative language defined by a user or ontology or dictionary), 2) "iffylanguage" which may be language defined by a user, ontology, or dictionary, as being negative language in certain, defined contexts, while being positive language in other defined contexts, 3) "badcode" (e.g., negative non-language features of a web page), and 4) "iffycode" which may be non-language that may be negative non-language features in certain contexts, while being positive non-language features in other contexts The language or sematic data features associated with a web browser or URL may be extracted, as in block 906. A determination is made as to whether the extracted language features are malicious, as in block 908. If yes, a reputation score count may be set equal to one for "badlanguage", as in block 910. The functionality 900 may move to block 916 from block 910. If no at block 908, a determination is made as to whether the extracted language features are suspicious, as in block 912. If yes at block 912, the reputation score count may be set equal to one for "iffy language", as in block 914. If no at block 912, the functionality 900 may move to block 916. The functionality may also move from block 914 to block 916. One or more non-language features may be extracted, at block 916. A determination is made as to whether the extracted non-language features are malicious, as in block 918. If yes at block 918, a reputation score count may be set equal to one for "badcode", as in block 920. The functionality 900 may move from block 920 to block 926. If no at block 918, a determination is made as to whether the extracted non-language features are suspicious, as in block 922. If yes, the reputation score count may be set equal to one for "iffycode", as in block 924. If no at block 922, the functionality 900 may move to block 926. The functionality may also move from block 924 to block 926. The findings of the reputation counts may be collated, as in block 926 and a reputation score may be returned (such as to a proxy), as in block 928.

Figure 10:
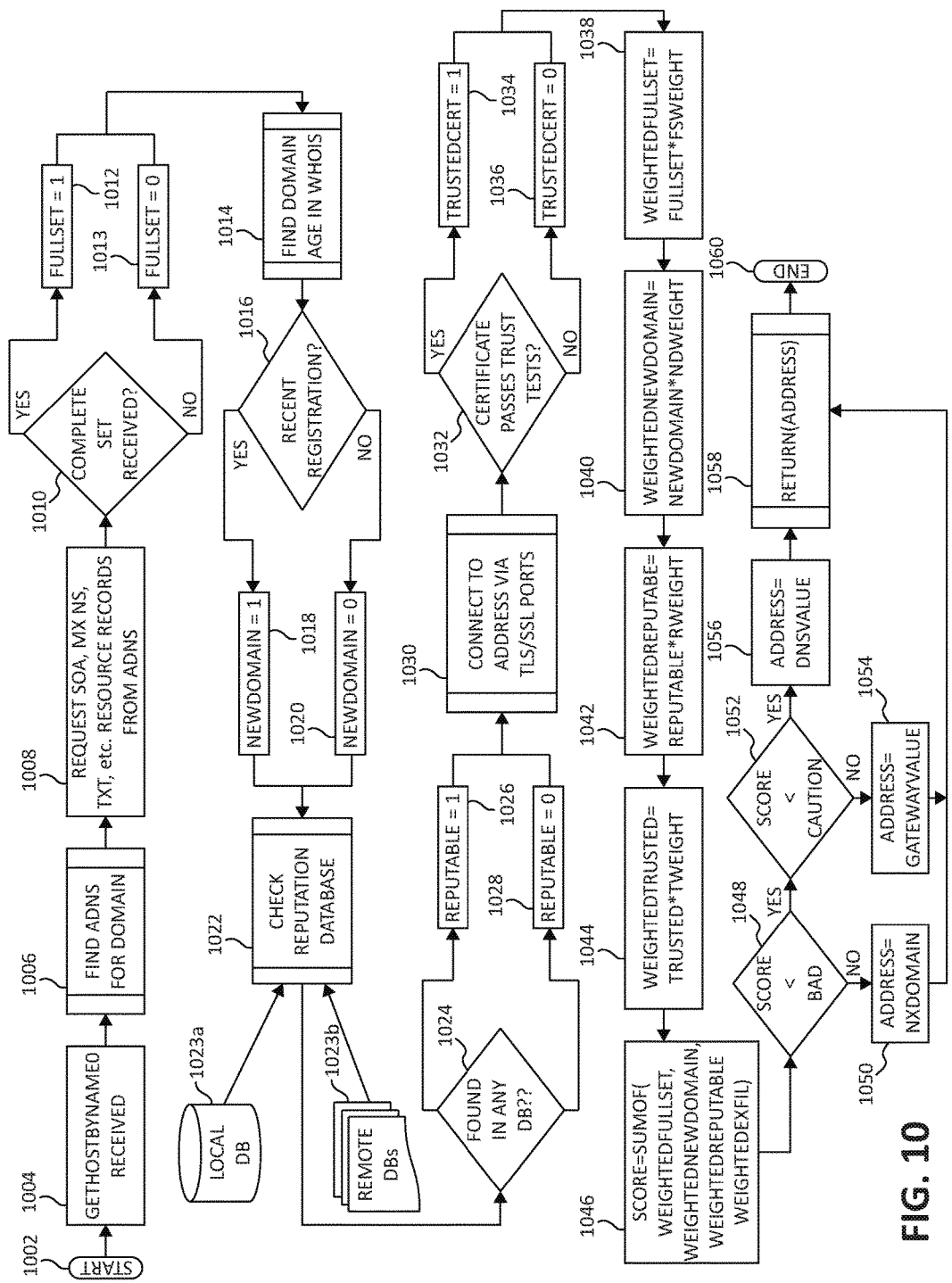
FIG. 10 is a flowchart diagram depicting an exemplary method for verifying trustworthiness of redirection targets by a processor, in which aspects of the present invention may be realized.

FIG. 10 is a flowchart diagram depicting an exemplary method for verifying trustworthiness of redirection targets by a processor, in which aspects of the present invention may be realized. The functionality 1000 may be implemented as a method executed as instructions on a machine, where the instructions are included on at least one computer readable medium or one non-transitory machine-readable storage medium. In one aspect, the functionality 1000 is executed from a perspective of a DNS server. The functionality 1000 may start in block 1002. A DNS data communication protocol having an API call or evaluate a FQDN such as, for example, a "gethostbynam( )" message may be received, as in block 1004. A search operation is executed to identify an Authoritative Domain Name Server (ADNS) server for the domain, as in block 1006. One or more resource records are requested from the ADNS server, as in block 1008. For example, the resource records may include a start of address (SOA) records, a mail exchanger (MX) records, name server (NS) records, text (TXT) records, and the like. Upon receiving the resource records, a determination operation is performed to determine if a complete set or "full set" of resource records are received, as in block 1010. If yes at block 1010, the set of resource records is assigned a value, such as one "1", as in block 1012. If no at block 1010, the set of resource records is assigned a value, such as zero "0", as in block 1013.

At block 1014, a search operation is performed in a domain registry (e.g., "WHOIS") to identify the domain name age. A determination operation is performed to determine if the domain name registration has occurred with a selected time period (e.g., "has the domain registration recently occurred, such as, in the last 30 days"), as in block 1016. If yes at block 1016, the domain age of the registered domain (e.g., a "new domain" or "recently registered domain") may be assigned a value, such as negative one "–1", as in block 1018. If no at block 1016, the domain age of the registered domain (e.g., an "old domain" or "non-recent registered domain") may be assigned a value, such as zero "0", as in block 1020.

At block 1022, a search operation is performed using a reputation database, such as, for example by using a local database 1023a or remotely located database 1023b, to identify, collect, and/or acquire reputation data of the domain. A determination operation is performed to determine if the domain name has reputation data (e.g., a trust rating) in the reputation database, as in block 1024. The reputation data may be reputation data in relation to the domain name itself, URLs associated with the domain name, domain name purchaser or registrant, or email addresses associated with the domain name. The reputation data may be tracked on a person or an entity, a domain name, a URL associated with the domain name, an email address or any combination thereof. The reputation data may include ratings for various categories, such as email practices, website content, privacy policies and practices, fraudulent activities, domain name related complaints, overall reputation, etc. If yes at block 1024, the reputable data may be assigned a value, such as one "1", as in block 1026. If no at block 1024, the reputable data may be assigned a value, such as zero "0", as in 1028. The reputation data may also have an original value that may be received from other reputation records using the sum, average, minimum, maximum, or any other formula. The original value received may also be the assigned value for blocks 1026 and 1028.

At block 1030, a connect to address via Transport Layer Security/Secure Sockets Layer (TLS/SSL) ports (which may be used to encrypt confidential data sent over an insecure network, such as the Internet) may be performed, at block 1030. A determination operation is performed to determine if a certificate passes a trust text, as in block 1032. If yes at block 1032, the trusted certificate may be assigned a value, such as one "1", as in block 1034. If no at block 1032, the trusted certificate may be assigned a value, such as zero "0", as in block 1034.

At block 1038, a weighted value for the full set of records may be calculated by multiplying the assigned value of the full set of records with a full set of records weight parameter, index value, percentage, or other weighted numerical value. At block 1040, a weighted value for the domain age may be calculated by multiplying the assigned value of the domain age with a domain age weight parameter, index value, percentage, or other weighted numerical value. At block 1042, a weighted value for the reputation data of the domain may be calculated by multiplying the assigned value of the reputation data of the domain with a reputation weight parameter, index value, percentage, or other weighted numerical value. At block 1044, a weighted trusted value may be calculated by multiplying the assigned value of the trusted domain with a trust weight parameter, index value, percentage, or other weighted numerical value.

At block 1046, a reputation score may be calculated according to the assigned values for generating a response or answer to the trustworthy query. For example, the reputation score may be a sum of each of the weighted values of the weighted full set of records, the weighted domain age, the weighted reputation data of the domain, and/or the weighted trust data. A determination operation is performed to determine if the reputation score is less than a first level threshold or "bad threshold" (e.g., a threshold indicating the degree for attempting to execute a data exfiltration attempt is greater than a defined percentage such as 50 percent), as in block 1048. If no at block 1048, blocked value is provided in the DNS response message to prevent the data exfiltration activity upon the DNS response score being greater than the data exfiltration attack threshold, as in block 1050. If yes at block 1048, a determination operation is performed to determine if the DNS response score is less than a second level threshold or "cautionary threshold" (e.g., a threshold indicating the degree for attempting to execute a data exfiltration attempt is less than a defined percentage such as 50 percent), as in block 1052. If no at block 1052, a DNS server address (e.g., a gateway value or address to a DNS server) may be provided in a DNS response upon the reputation response score being less than the trustworthy threshold, as in block 1054. If yes at block 1052, provide the address or DNS value to the DNS query, as in block 1056. The DNS response is returned, as in block 1058. The functionality 1000 may end, as in block 1060.

Figure 11:
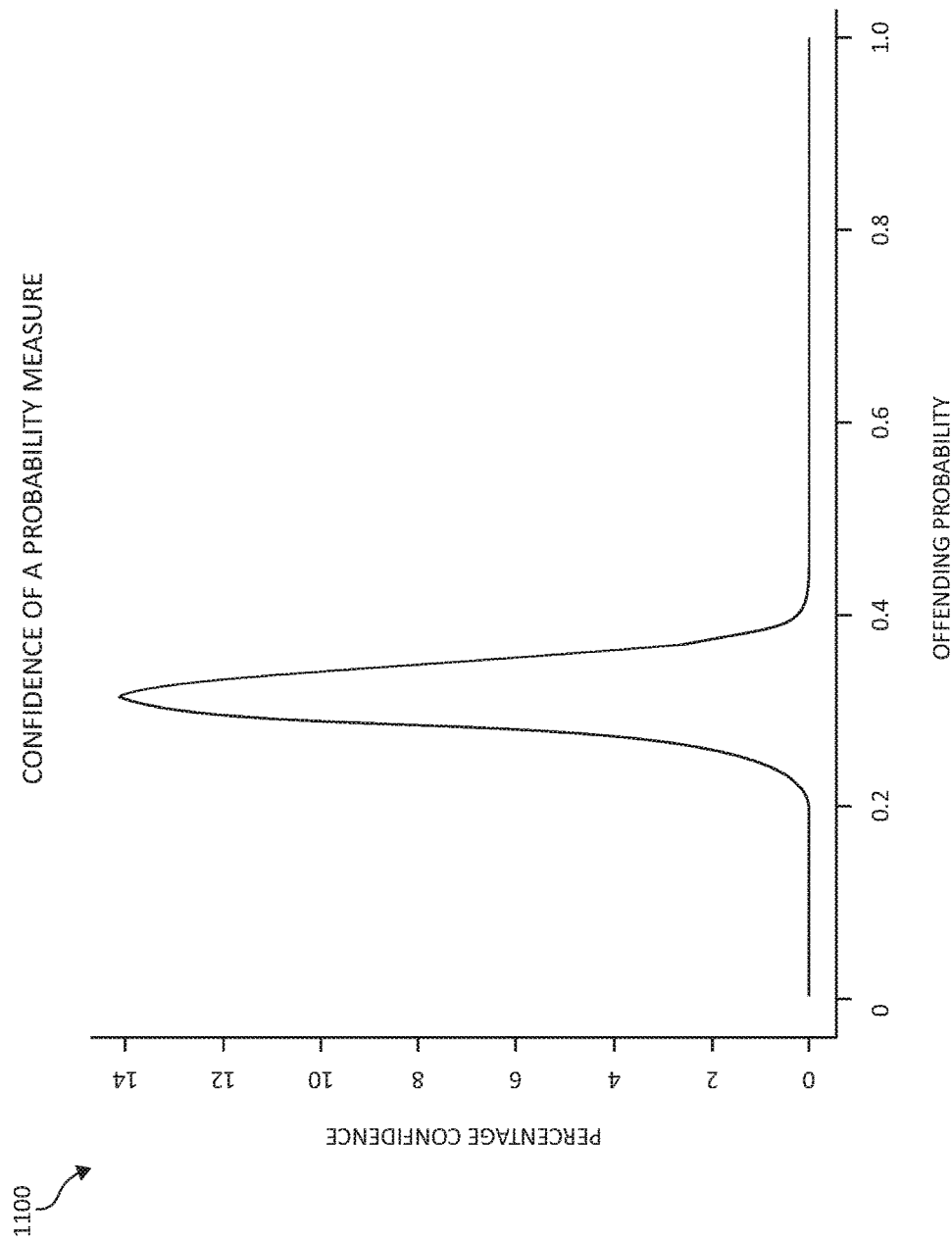
FIG. 11 is a diagram depicting a chart indicating a confidence of a probability measure, in which aspects of the present technology may be realized.

Turning now to FIG. 11, a diagram depicting a chart 1100 indicating a confidence of a probability measure is depicted. In one aspect, a beta distribution provides a distribution of distributions, such as depicted in the equation below. For example, if data traffic going to example.com is 85% disruptive, then the beta distribution may determine the confidence level for 85%. An alpha parameter may be a number of offending traffic requests, as measured by an intrusion detection system (IDS), over a specific total time to live (TTL) time. The beta parameter may be a number of sufficient traffic requests over the same TTL time.

$$f(x; \alpha, \beta) = \frac{\Gamma(\alpha + \beta)}{\Gamma(\alpha)\Gamma(\beta)} x^{\alpha-1} (1-x)^{\beta-1} = 1/B(\alpha, \beta) x^{\alpha-1} (1-x)^{\beta-1} \quad (3)$$

$$\hat{\alpha} = \bar{x}\left(\frac{\bar{x}(1-\bar{x})}{\bar{v}} - 1\right), \text{ conditional on } \bar{v} < \bar{x}(1-\bar{x}),$$

$$\hat{\beta} = \bar{x}\left(\frac{\bar{x}(1-\bar{x})}{\bar{v}} - 1\right), \text{ conditional on } \bar{v} < \bar{x}(1-\bar{x}),$$

For example, the alpha and beta parameters in the case of users accessing a web browser, can provide an average amount of times the traffic is offending. If alpha denotes the offending traffic measured by the IDS and the other traffic is beta, then one set of parameters may be represented, for example, as 85/85+100=85% where alpha/(alpha+beta). This means that the IDS classified 85% of the traffic as offensive. However, using 185 samples, the degree of confident of the IDS classification may be measured while taking into the number of samples, such as, for example, as demonstrated in FIG. 11 illustrating the confidence of a probability measure curve.

Figure 12:
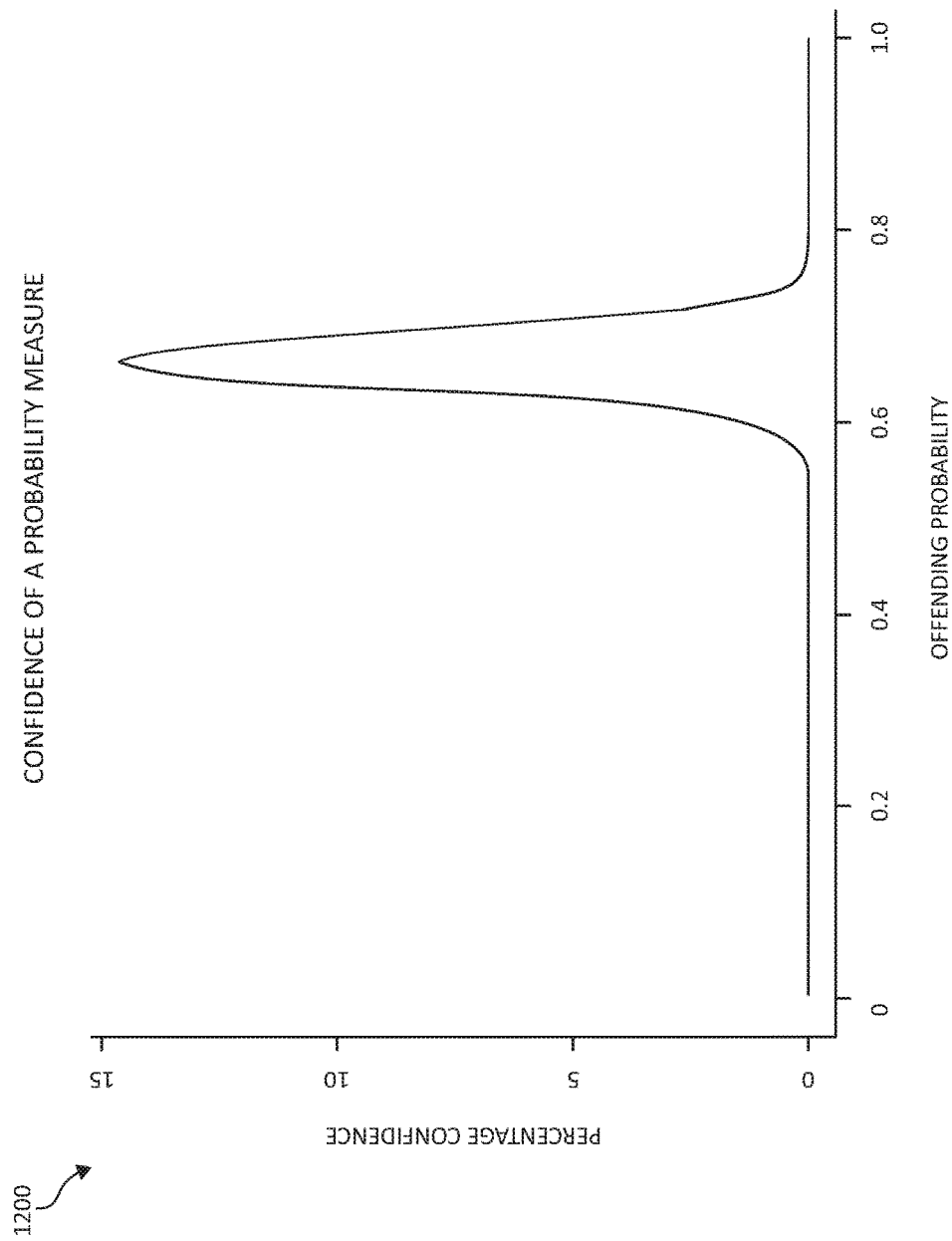
FIG. 12 is a diagram depicting an additional chart indicating a confidence of a probability measure, in which aspects of the present technology may be realized.
Figure 13:
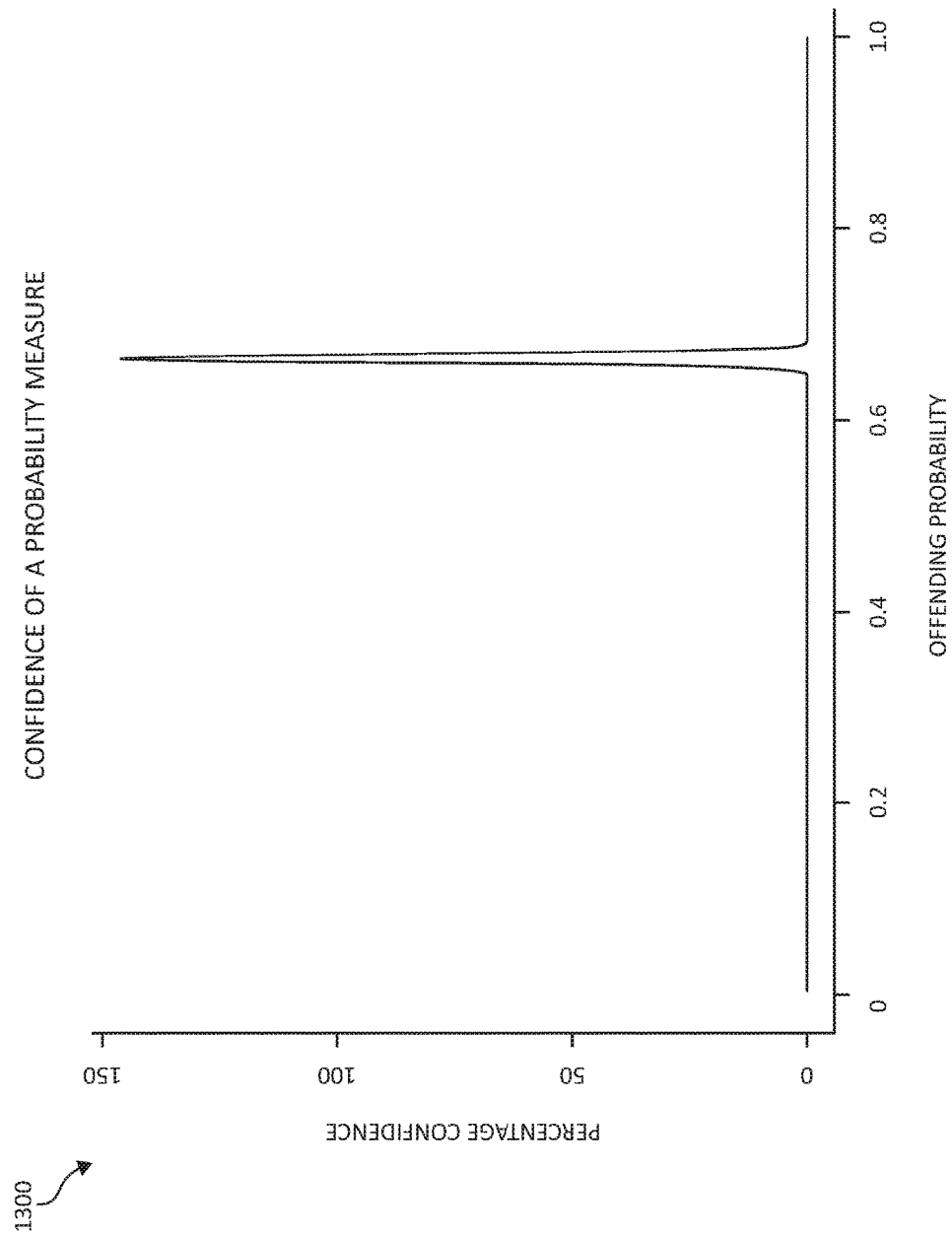
FIG. 13 is a diagram depicting an additional chart indicating a confidence of a probability measure, in which aspects of the present technology may be realized.

More specifically, the confidence of probability measure curves 1100, 1200, and 1300 demonstrated in FIGS. 11-13 depict a confidence percentage on the Y-axis and an offending probability on the X-axis. As a result, there may be only a 14% confidence that an attack is occurring given the number of bad and good traffic, as depicted in FIG. 11. As the number of offending traffic goes up such that alpha is 200 and beta is 100, the confidence of probability measure curve 1200 is demonstrated in FIG. 12. As a result, there may be only a 15% confidence that an attack is occurring given the number of bad and good traffic, as depicted in FIG. 12. However, if the samples are: alpha is 20000 and beta is 10000, the confidence of probability measure curve 1300 is demonstrated in FIG. 13, where there is an 150% confidence. In one aspect, a recommendation may be provided to use the log scale for high traffic systems. The percentage confidence may be used to block DNS lookups for sites if it reaches an empirically determined threshold. The accumulation of alpha and beta are aggregated for a rolling window of time based on a TTL to attempt to isolate traffic for a particular user. The TTL will be measured to the nanosecond to increase the granularity for particular users.

Figure 14:
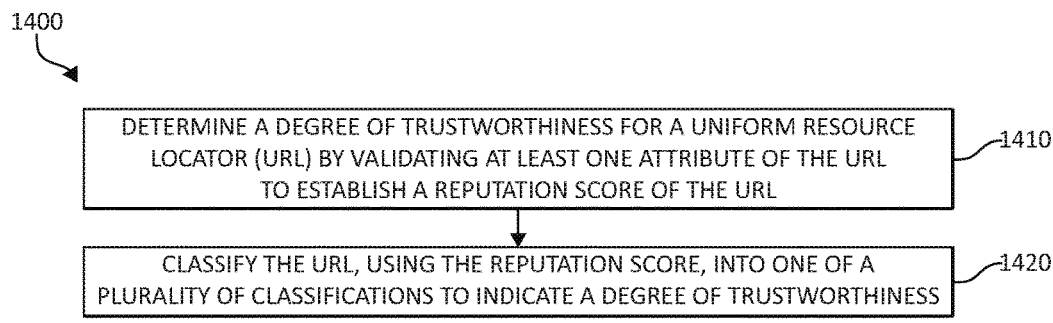
FIG. 14 is a flowchart diagram depicting an additional exemplary method for verifying trustworthiness of redirection targets in a tiered web delivery network by a processor, again in which aspects of the present technology may be realized.

Turning now to FIG. 14, a method 1400 for verifying trustworthiness of redirection targets in a tiered delivery computing network using a proxy by a processor is depicted, in which various aspects of the illustrated embodiments may be implemented. That is, FIG. 14 is a flowchart of an additional example method 1400 for verifying trustworthiness of redirection targets in a tiered web delivery network of a computing environment according to an example of the present technology. The functionality 1400 may be implemented as a method executed as instructions on a machine, where the instructions are included on at least one computer readable medium or one non-transitory machine-readable storage medium. Starting in block 1410, a degree of trustworthiness for a uniform resource locator (URL) is determined by validating at least one attribute of the URL to establish a reputation score of the URL. The URL is classified, using the reputation score, into one of a plurality of classifications to indicate a degree of trustworthiness, as in block 1420.

In one aspect, in conjunction with and/or as part of at least one block of FIG. 14, the operations of 1400 may include each of the following. The operations of 1400 may include decomposing the URL at the proxy to establish a trustworthiness of a fully qualified domain name (FQDN) and a URL path. A character string related to the URL may be classified as benign, malignant, suspicious, or malicious. The URL may be redirected to a target browser upon the degree of trustworthiness being classified as benign. The URL may be redirected to a warning page related to a target browser upon the degree of trustworthiness being classified as suspicious. The URL may be redirected to a warning page related to a target browser upon the degree of trustworthiness being classified as anomalous. The URL may be redirected to a denied assess page related to a target browser upon the degree of trustworthiness being classified as malicious.

The present technology may be a system, a method, and/or a computer program product. The computer program product may include a computer readable storage medium (or media) having computer readable program instructions thereon for causing a processor to carry out aspects of the present technology.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present technology may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present technology.

Aspects of the present technology are described herein with reference to flowchart illustrations and/or block diagrams of methods, apparatus (systems), and computer program products according to embodiments of the technology. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present technology. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method, by a processor, for verifying trustworthiness of redirection targets in a tiered delivery computing network using a proxy in a computing network, comprising:
    determining a degree of trustworthiness for a uniform resource locator (URL) by validating at least one attribute of the URL to establish a reputation score of the URL, the at least one attribute of the URL subject to a weighted average of a heuristic analysis upon capturing and analyzing in real-time a domain name service (DNS) response wherein heuristics are extracted and analyzed from the DNS response; wherein the heuristics include at least URL time-to-live (TTL) information, contiguous or non-contiguous internet protocol (IP) address information, time zone entropy anomalies, and a DNS fluxiness ratio; and
    classifying the URL, using the reputation score, into one of a plurality of classifications to indicate the degree of trustworthiness; wherein one a plurality of redirect operations are performed according to the classification indicating the degree of trustworthiness to mitigate malicious communications.

2. The method of claim 1, further including decomposing the URL at the proxy to establish a trustworthiness of a fully qualified domain name (FQDN) and a URL path.

3. The method of claim 1, further including determining a character string related to the URL is classified as benign, malignant, suspicious, or malicious.

4. The method of claim 1, further including redirecting the URL to a target browser upon the degree of trustworthiness being classified as benign.

5. The method of claim 1, further including redirecting the URL to a warning page related to a target browser upon the degree of trustworthiness being classified as suspicious.

6. The method of claim 1, further including redirecting the URL to a warning page related to a target browser upon the degree of trustworthiness being classified as anomalous.

7. The method of claim 1, further including redirecting the URL to a denied access page related to a target browser upon the degree of trustworthiness being classified as malicious.

8. A system for enforced registry of cookies in a tiered delivery computing network, comprising:
    one or more computers with executable instructions that when executed cause the system to:
        determine a degree of trustworthiness for a uniform resource locator (URL) by validating at least one attribute of the URL to establish a reputation score of the URL, the at least one attribute of the URL subject to a weighted average of a heuristic analysis upon capturing and analyzing in real-time a domain name service (DNS) response wherein heuristics are extracted and analyzed from the DNS response; wherein the heuristics include at least URL time-to-live (TTL) information, contiguous or non-contiguous internet protocol (IP) address information, time zone entropy anomalies, and a DNS fluxiness ratio; and
        classify the URL, using the reputation score, into one of a plurality of classifications to indicate the degree of trustworthiness; wherein one a plurality of redirect operations are performed according to the classification indicating the degree of trustworthiness to mitigate malicious communications.

9. The system of claim 8, wherein the executable instructions decompose the URL at the proxy to establish a trustworthiness of a fully qualified domain name (FQDN) and a URL path.

10. The system of claim 8, wherein the executable instructions determine a character string related to the URL is classified as benign, malignant, suspicious, or malicious.

11. The system of claim 8, wherein the executable instructions redirect the URL to a target browser upon the degree of trustworthiness being classified as benign.

12. The system of claim 8, wherein the executable instructions redirect the URL to a warning page related to a target browser upon the degree of trustworthiness being classified as suspicious.

13. The system of claim 8, wherein the executable instructions redirect the URL to a warning page related to a target browser upon the degree of trustworthiness being classified as anomalous.

14. The system of claim 8, wherein the executable instructions redirect the URL to a denied access page related to a target browser upon the degree of trustworthiness being classified as malicious.

15. A computer program product for, by a processor, verifying trustworthiness of redirection targets in a tiered delivery computing network, the computer program product comprising a non-transitory computer-readable storage medium having computer-readable program code portions stored therein, the computer-readable program code portions comprising:
    an executable portion that determines a degree of trustworthiness for a uniform resource locator (URL) by validating at least one attribute of the URL to establish a reputation score of the URL, the at least one attribute of the URL subject to a weighted average of a heuristic analysis upon capturing and analyzing in real-time a domain name service (DNS) response wherein heuristics are extracted and analyzed from the DNS response; wherein the heuristics include at least URL time-to-live (TTL) information, contiguous or non-contiguous internet protocol (IP) address information, time zone entropy anomalies, and a DNS fluxiness ratio; and
    an executable portion that classifies the URL, using the reputation score, into one of a plurality of classifications to indicate the degree of trustworthiness; wherein one a plurality of redirect operations are performed according to the classification indicating the degree of trustworthiness to mitigate malicious communications.

16. The computer program product of claim 15, further including an executable portion that decomposes the URL at the proxy to establish a trustworthiness of a fully qualified domain name (FQDN) and a URL path.

17. The computer program product of claim 15, further including an executable portion that determines a character string related to the URL is classified as benign, malignant, suspicious, or malicious.

18. The computer program product of claim 15, further including an executable portion that redirects the URL to a target browser upon the degree of trustworthiness being classified as benign.

19. The computer program product of claim 15, further including an executable portion that redirects the URL to a warning page related to a target browser upon the degree of trustworthiness being classified as suspicious or redirects the URL to a warning page related to a target browser upon the degree of trustworthiness being classified as anomalous.

20. The computer program product of claim 15, further including an executable portion that redirects the URL to a denied access page related to a target browser upon the degree of trustworthiness being classified as malicious.

* * * * *